US012600215B2

(12) United States Patent
Engerman

(10) Patent No.: US 12,600,215 B2
(45) Date of Patent: Apr. 14, 2026

(54) ELECTRIC AXLE WITH COMPACT ELECTRIC MACHINE AND GEAR TRAIN LAYOUT

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 224 days.

(21) Appl. No.: 18/304,908

(22) Filed: Apr. 21, 2023

(65) Prior Publication Data

US 2024/0351415 A1      Oct. 24, 2024

(51) Int. Cl.
*B60K 1/00*      (2006.01)
*B60K 17/16*      (2006.01)

(52) U.S. Cl.
CPC ............... *B60K 1/00* (2013.01); *B60K 17/16* (2013.01); *B60K 2001/001* (2013.01)

(58) Field of Classification Search
CPC .... B60K 1/00; B60K 17/16; B60K 2001/001; B60K 6/22; B60K 6/365; B60K 6/50; B60K 17/043; B60K 17/165; F16H 37/0813; F16H 37/0806; F16H 48/10; F16H 2048/343; F16H 2057/02052; F16H 2057/02034; F16H 57/0452; F16H 57/045
See application file for complete search history.

(56) References Cited

U.S. PATENT DOCUMENTS

| | | | |
|---|---|---|---|
| 6,401,850 B1 | 6/2002 | Bowen | |
| 8,403,088 B2 | 3/2013 | Knoblauch et al. | |
| 8,998,765 B2 * | 4/2015 | Sten ..................... B60K 17/165 |
| | | | 475/221 |
| 9,527,382 B2 | 12/2016 | Smetana | |
| 9,593,754 B2 | 3/2017 | Sten | |
| 9,625,021 B2 | 4/2017 | Knoblauch et al. | |
| 9,783,035 B1 | 10/2017 | Huang et al. | |
| 10,500,951 B2 | 12/2019 | Pydin | |
| 10,518,627 B2 | 12/2019 | Nagpal et al. | |
| 10,525,810 B2 | 1/2020 | Jegebris et al. | |
| 11,448,305 B2 * | 9/2022 | Engerman .............. B60K 17/04 |
| 2019/0283566 A1 | 9/2019 | Nilsson | |
| 2020/0055391 A1 | 2/2020 | Kumar et al. | |

(Continued)

FOREIGN PATENT DOCUMENTS

DE      102009006424 A1 *   7/2010

OTHER PUBLICATIONS

Engerman, E., "Electric Axle With Compact Electric Machine and Gear Train Layout," U.S. Appl. No. 18/304,901, filed Apr. 21, 2023, 30 pages.

*Primary Examiner* — Farhana Pervin
(74) *Attorney, Agent, or Firm* — McCoy Russell LLP

(57)      ABSTRACT
Systems and method for an electric axle assembly. The electric axle assembly includes, in one example, an electric machine rotationally coupled to a planetary differential and a first and second axle shaft directly rotationally coupled to the planetary differential. In the axle assembly, the second axle shaft is longer than the first axle shaft and the electric machine is positioned laterally between a first drive wheel shaft and a second drive wheel shaft that are rotationally coupled to the first axle shaft and the second axle shaft.

20 Claims, 9 Drawing Sheets

(56)　　　　　References Cited

U.S. PATENT DOCUMENTS

| | | | |
|---|---|---|---|
| 2020/0276895 A1* | 9/2020 | Mepham | B60K 17/046 |
| 2020/0318693 A1* | 10/2020 | Lee | B60L 3/0061 |
| 2021/0138885 A1* | 5/2021 | Engerman | B60K 17/16 |
| 2021/0237568 A1* | 8/2021 | Liu | H02K 7/006 |
| 2022/0065345 A1* | 3/2022 | O'Neil | F16H 63/3483 |
| 2022/0336825 A1 | 10/2022 | Speidel et al. | |
| 2022/0364631 A1 | 11/2022 | Glückler et al. | |
| 2023/0128748 A1* | 4/2023 | Umerley | F16H 57/0445 |
| | | | 180/65.1 |
| 2023/0304572 A1* | 9/2023 | Vanderlip | F16H 57/0441 |
| 2024/0239180 A1* | 7/2024 | Beck | B60K 6/547 |
| 2024/0401679 A1* | 12/2024 | Katayama | F16H 57/045 |

* cited by examiner

ELECTRIC AXLE WITH COMPACT ELECTRIC MACHINE AND GEAR TRAIN LAYOUT

TECHNICAL FIELD

The present disclosure relates to an electric axle with a space efficient architecture for incorporation into a support structure.

BACKGROUND AND SUMMARY

Segments of the vehicle market are moving towards electrification. However, the inventors have recognized that vehicle platform electrification presents investment costs and project management complexity which create challenges for automotive manufacturers and suppliers. Further, the inventors have also recognized that it may be desirable to utilize internal combustion engine range extenders in certain hybrid vehicle platforms and use P4 architectures in other hybrid platforms. In the P4 hybrid architecture, an internal combustion engine generates propulsive power for one drive axle and an electric motor generates propulsive power for another drive axle. Attempts have been made to manage this complexity by carrying over certain features across vehicle platforms. The inventors have recognized that the carry-over of these components may create packaging challenges. Specifically, features of certain hybrid powertrains, such as engine componentry, may impose space constraints on electric drive units (e.g., electric axles). Other vehicle components may also pose space constraints on electric drive units such as the vehicle frame, specifically during suspension jounce and rebound. Further, the performance demands of certain vehicles may be comparatively high and the space under an engine component for an electric drive unit may be limited in some hybrid powertrains. Further, in certain vehicles, the options for the location of the wheel centerline may be constrained due to the vehicle dynamics, suspension dynamics, suspension layout, frame layout, etc. Therefore, the viable options for electric motor placement are decreased as a result.

The inventors have recognized the abovementioned challenges and developed an electric axle assembly. The electric axle assembly includes, in one example, an electric machine rotationally coupled to a planetary differential. The electric axle assembly further includes a first axle shaft and a second axle shaft which are each directly rotationally coupled to the planetary differential. Further, in the electric axle assembly, the second axle shaft is longer than the first axle shaft. Still further, in the electric axle assembly, the electric machine (e.g., traction motor) is positioned laterally between a first drive wheel shaft and a second drive wheel shaft that are rotationally coupled to the first axle shaft and the second axle shaft. Wheel end gear reductions (e.g., final drive gear reductions) may be used to rotationally couple the axle shafts to the drive wheel shafts. In the electric axle assembly, rotational axes of the drive wheel shafts are offset from rotational axes of the first and second axle shafts. In this way, the electric machine and the second axle shaft are space efficiently packaged in the axle assembly. To elaborate, the use of the planetary differential allows the second axle shaft (e.g., jumper shaft) to be positioned closer to the electric machine, if desired, to increase axle compactness. Consequently, the electric axle assembly imposes less space constraints on surrounding vehicle components. For instance, the electric axle may be positioned under an engine compartment (when the axle is included in a hybrid powertrain) while achieving target performance characteristics.

In one example, a gear reduction may be used to rotationally couple the electric machine and the planetary differential. In such an example, the second gear in the gear reduction is fixedly coupled to a ring gear in the planetary differential. In this way, the space efficiency of the electric axle assembly is further increased.

In another example, a rotational axis of the electric machine may be axially offset from, and parallel to, in some cases, rotational axes of the drive wheels. Designing the electric axle in this manner allows the axle to handle high torque demands in certain powertrain architectures such as when the electric axle is a front axle.

In yet another example, a lubricant reservoir (e.g., oil pan) of an internal combustion lubrication system may be positioned below the electric machine and the second axle shaft. When the lubricant reservoir is used in conjunction with the planetary differential and the jumper shaft, its size is less constrained by the axle components. Consequently, the electric axle may be more effectively incorporated into the hybrid powertrain.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric axle assembly that is able to achieve greater gear train efficiency and a smaller package than other electric axles while also attaining the performance demands of a wide variety of powertrains such as hybrid powertrains (e.g., powertrains with a p4 hybrid configuration as well as powertrains with internal combustion engines that function as range extenders) is described herein. However, it will be understood, that the electric axle assembly may also be used in all-electric powertrains, in certain examples. To achieve these efficiency, packaging, and performance gains, the electric axle includes a planetary differential and a jumper axle shaft which extends down the side of a traction motor. Further, in certain examples, the electric axle includes wheel end gear reductions coupled to drive wheels on opposing lateral sides of the axle to enable the axle's gear train and space efficiency to be increased while meeting drive torque and packaging demands of certain vehicle platforms. In the hybrid powertrain example, a lubricant reservoir (e.g., oil pan) of an internal combustion lubrication system may be positioned below the traction motor and the jumper axle shaft. Positioning the lubricant reservoir in this manner allows the electric axle to pose less space constraints on the reservoir and avoid the need to decrease the reservoir's size, in some instances, if desired.

Figure 1:
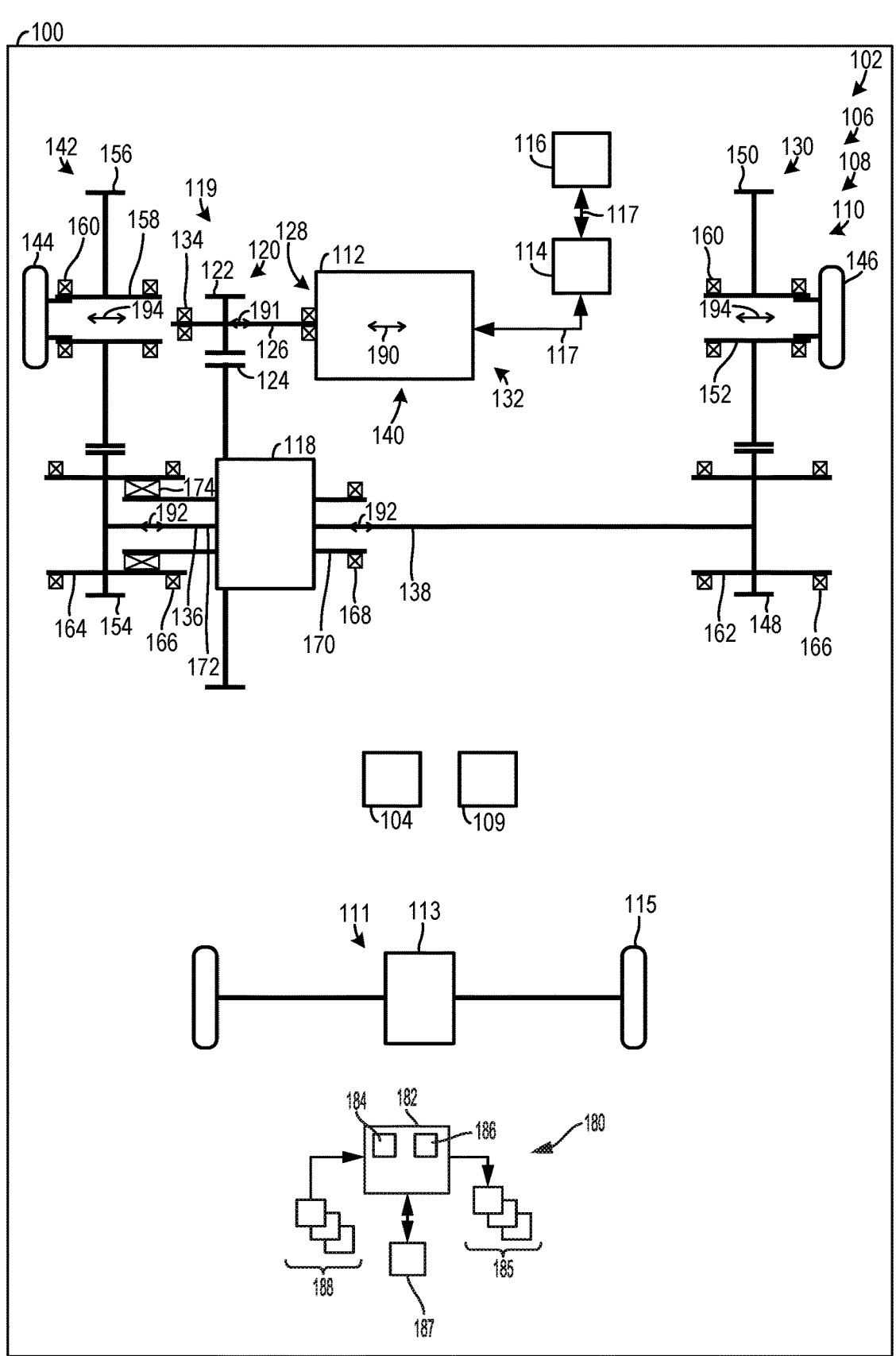
FIG. 1 shows a first example of an electric axle that is included in a powertrain.

FIG. 1 shows a schematic illustration of a vehicle 100 with a powertrain 102. The powertrain 102 is a hybrid powertrain which includes an internal combustion engine 104, in the illustrated example. The internal combustion engine 104 may be used to recharge one or more energy storage device(s) 116, in one example. However, in another example, the internal combustion engine 104 may be used to provide propulsive power to an axle 111. However, in other examples, the powertrain 102 may be an all-electric powertrain where the internal combustion engine is omitted.

The powertrain 102 includes an electric drive assembly 106 with an electric axle assembly 108. The electric axle assembly 108 includes an electric axle 110. As described herein an electric axle is an electric drive incorporated into an axle. The electric axle 110 may be an electric beam axle, in one example. A beam axle is an axle with mechanical components which structurally support one another and extend between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, in the beam axle example, the camber angle of the wheels may remain substantially constant as the suspension moves through its travel. Therefore, the beam axle may be coupled to a dependent suspension system 109, in one example. However, in other examples, the electric axle may not be a beam axle and the axle may be coupled to an independent suspension system.

Further, the electric axle 110 and the other electric axles described herein are illustrated as single speed electric axles that do not include clutches or other mechanisms which allow the gear train to shift between different gear ratios (e.g., shift between discrete gear ratios or shift between a continuous number of gear ratios). The use of a single speed electric axle allows the likelihood of component degradation to be decreased. However, in other examples, the electric axle 110 and/or the other electric axles described herein may be designed to shift between two or more gear ratios (e.g., discrete gear ratios), which may however increase axle complexity.

The electric axle 110 includes an electric machine 112 (e.g., traction motor). The electric machine 112 may be an electric motor-generator, for example. For instance, the electric machine 112 may be designed as a multi-phase alternating current (AC) motor-generator. However, in other examples, the electric machine may be a motor without generator capabilities or may be a direct current (DC) motor. However, it will be appreciated that many multi-phase AC motor designs achieve greater efficiency than DC motor designs.

The electric axle 110 may be a front axle, in one example. In such an example, the front axle may be a steerable axle. Further, in such an example, the powertrain 102 may additionally include the rear axle 111 which may contain a differential 113 and drive wheels 115. In one example, the rear axle 111 may receive rotational input from the internal combustion engine 104 or an electric drive unit. However, in other examples, the rear axle may not be driven by a prime mover.

As illustrated in FIG. 1, the electric machine 112 may be electrically coupled to an inverter 114. The inverter 114 is designed to convert direct current (DC) electric power to alternating current (AC) electric power and vice versa. Therefore, the electric machine 112 may be an AC electric machine, as previously indicated. However, in other examples, the electric machine may be a DC electric machine and the inverters may therefore be omitted from the electric drive, in such an example. The inverter 114 may receive electric energy from the one or more energy storage device(s) 116 (e.g., traction batteries, capacitors, combinations thereof, and the like). Arrows 117 signify the electric energy transfer between the electric machine 112, the inverter 114, and the energy storage device(s) 116 that may occur during different modes of electric axle operation (e.g., a drive mode and a regeneration mode). As such, during a drive mode, electric energy may flow from the energy storage device(s) 116 to the electric machine 112 and during a regenerative mode, electric energy may flow in the opposite direction from the electric machine to the energy storage device(s).

The electric axle 110 further includes a differential 118. As discussed in greater detail herein the differential 118 is a planetary differential. A gear train 119 may be used to rotationally couple various components in the axle. To elaborate, a gear reduction 120 that includes a gear 122 and a gear 124 is used to rotationally couple the electric machine 112 to the planetary differential 118. The gear 122 is rotationally coupled to an input shaft 126 which is attached to a rotor shaft of the electric machine 112. However, in other examples, additional gear reductions and/or shafts may be used to rotationally couple the electric machine to the differential.

The gear reduction 120 is positioned on one lateral side 128 of the electric machine 112 and a wheel end gear reduction 130 is positioned on the other lateral side 132 of the electric machine, in the illustrated example. In this way, the axle achieves a profile that is less likely to interfere with surrounding vehicle components, such as suspension system components and the like. However, the gear reduction 120 and/or the wheel end gear reduction 130 may be positioned in an alternate location, in other examples. The gear 124 is illustrated as a differential input gear. However, other gear train configurations have been contemplated.

Bearings 134 may be coupled to opposing sides of the shaft 126 to support and enable rotation of the shaft. The bearings 134 and the other bearings described herein may include roller elements (e.g., cylindrical rollers, tapered cylindrical rollers, spherical balls, and the like) as well as races that contain the roller elements.

The planetary differential 118 is coupled to axle shafts 136 and 138. The axle shaft 138 is longer than the axle shaft 136. As such, the axle shafts have unequal lengths. Further, the axle shaft 138 passes along a longitudinal side 140 of the electric machine 112. The axle shaft 138 may therefore be a jumper shaft. Using a jumper shaft in the axle allows the wheel end gear reduction 130 to be located in a desired position (e.g., on the lateral side 132 of the electric machine). The axle shaft 138 may specifically be positioned on a rearward longitudinal side of the electric machine 112. Positioning the axle shaft 138 in this manner allows the axle to articulate as desired and when the electric axle is used in a hybrid powertrain, the engine may achieve a desired amount of roll, when the axle shaft is arranged adjacent to the longitudinal side 140 of the electric machine 112.

In the illustrated example, wheel end gear reductions 130, 142 are coupled to the axle shaft 138 and the axle shaft 136, respectively. A wheel end gear reduction refers to a gear reduction downstream of the interface between the differential and the axle shafts. However, in other examples, the wheel end gear reductions 130, 142 may be omitted from the electric axle 110 or additional gear reductions and shafts may be used to rotationally couple the axle shafts 136, 138 with drive wheels 144 and 146. The wheel end gear reductions 130, 142 are specifically illustrated as final drive gear reductions. The wheel end gear reduction 130 includes a gear 148 that is rotationally coupled to the axle shaft 138 and a gear 150 that is rotationally coupled to a drive wheel shaft 152, in the illustrated example. Further, in the illustrated example, the wheel end gear reduction 142 includes a gear 154 that is rotationally coupled to the axle shaft 136 and a gear 156 that is rotationally coupled to a drive wheel shaft 158. The drive wheel shafts 152, 158 are rotationally coupled to the drive wheels 144, 146, respectively. However, in alternate examples, the electric axle may include additional gear reductions between the axle shafts 136, 138 and the drive wheels 144, 146 or the wheel end gear reductions. Additionally or alternatively, suitable mechanical components such as chains, combinations thereof, and the like may be used to rotationally couple the axle shafts and the drive wheels.

Bearings 160 may be coupled to opposing sides of each of the drive wheel shafts 152, 154. However additional or alternate bearing arrangements may be used in other examples. Further, the gears 148, 154 in the wheel end gear reductions 130, 142 may rotate on shafts 162, 164. In such an example, bearings 166 may be coupled to shafts 162, 164. Further, a bearing 168 may be coupled to an output interface 170 of the differential 118 and a bearing 172 may be coupled to another output interface 174 of the differential. Further, the bearing 172 may be coupled to the shaft 164.

An axis system is provided in FIG. 1, as well as in FIGS. 2-13, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Further, a rotational axis 190 of the electric machine 112, a rotational axis 191 of the input shaft 126, and rotational axes 192 of the axle shafts 136, 138 are provided for reference.

In the illustrated example, the rotational axis 190 of the electric machine 112 is axially offset but parallel to the rotational axes 192 of the axle shafts 136, 138. Further, rotational axes 194 of the drive wheel shafts 152, 158 (and the drive wheels correspondingly) are axially offset from the rotational axis 190 of the electric machine 112. As such, the drive wheel shafts 152, 158 are axially offset but parallel to the axle shafts 136, 138. Positioning the rotational axes of the various axle components in this manner allows a desired wheel centerline to be achieved. The desired location of the wheel centerline may be affected by factors such as the vehicle dynamics (e.g., suspension dynamics), suspension layout, frame layout, and the like.

The vehicle 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits. The memory 186 includes known data storage mediums such as random access memory, read only memory, keep alive memory, combinations thereof, and the like.

The controller 182 may receive various signals from sensors 188 positioned in different locations in the vehicle 100 and the electric axle 110, more specifically. The sensors

188 may include an electric machine speed sensor, energy storage device temperature sensor(s), an energy storage device state of charge sensor(s), wheel speed sensors, and the like. The controller 182 may also send control signals to various actuators 185 coupled at different locations in the vehicle 100, and the electric axle 110. For instance, the controller 182 may send signals to the inverter 114 to adjust the rotational speed of the electric machine 112. The other controllable components in the vehicle and powertrain may function in a similar manner with regard to command signals and actuator adjustment.

The vehicle 100 may also include one or more input device(s) 187 (e.g., an accelerator pedal, a brake pedal, a differential locker actuator, a console instrument panel, a touch interface, a touch panel, a keyboard, combinations thereof, and the like) in electronic communication with the controller 182. The input device(s) 187, responsive to operator input, may generate an acceleration adjustment request and/or other commands for vehicle control.

FIGS. 2-10 show an example of an electric axle assembly 200 with an electric axle 202. The electric axle 202 as well as the other electric axles described herein may include structural and functional features, components, and the like that are similar to the electric axle 110 depicted in FIG. 1 and vice versa. Therefore, any of the components in the electric axle 110 depicted in FIG. 1 may be included in the electric axle 202 depicted in FIGS. 2-10 as well as the other electric axles discussed herein and vice versa.

Figures 2, 3:
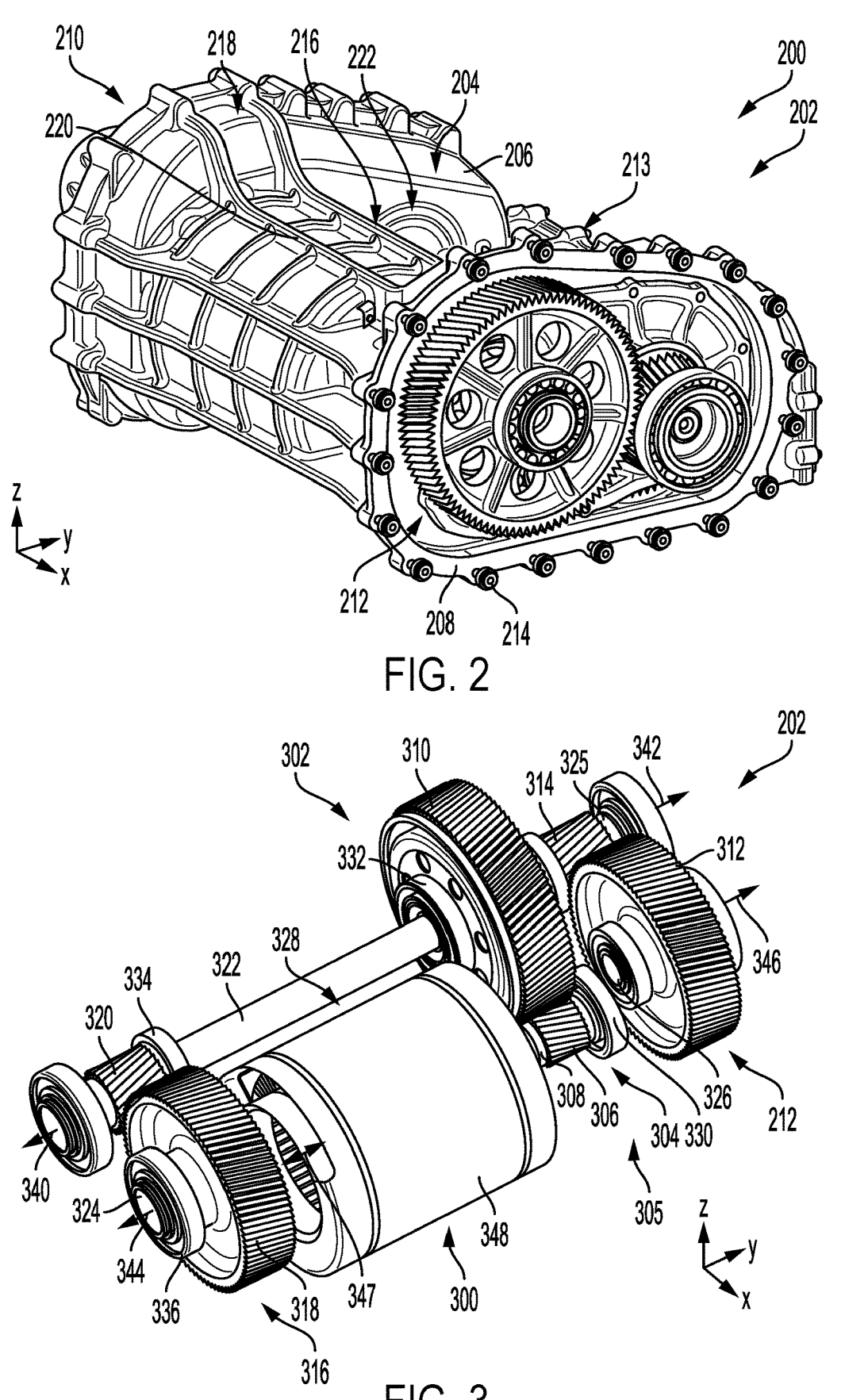
FIGS. 2-10 show different views of a second example of an electric axle.

FIG. 2 shows the electric axle 202 with a housing 204. As illustrated, the housing 204 includes a body 206 and attachment interfaces 208 (e.g., flanges) for access panels 210 which provide access to the wheel end gear reductions. A wheel end gear reduction 212 is revealed by removal of one of the housing access panels 210, in the example depicted in FIG. 2. However, it will be appreciated that a housing access panel may be removably coupled to the attachment interface 208 via attachment devices 214 (e.g., bolts, pins, clamps, combinations thereof, and the like). Another access panel 213 may be removably coupled to the body 206 (e.g., the front of the body) to provide access to a differential and axle shafts that are directly coupled to the differential. Further, the access panel 213 may provide access to other wheel end gear reductions, discussed in greater detail herein. In this way, the axle's internal componentry may be efficiently accessed during servicing, repair, and the like, for instance.

In the illustrated example, the housing 204 includes a central section 216 with a reduced height which may allow a lubrication reservoir to be positioned between lateral sections 218 with a greater height than the central section. Further, ribs 220 are shown laterally extending across the housing body 206. However, in other examples, the ribs 220 may have other contours or may be omitted from the housing 204. Additionally, the lateral sections 218 may taper in a rearward direction, in one example. However, the housing may have another profile and/or may be divided into other sections which may or may not be removably attached to one another, in other examples.

As discussed in greater detail herein, a lubricant reservoir (e.g., oil pan) may be positioned in a recess 222 formed between the lateral sections 218. To elaborate, the lubricant reservoir may be positioned above an electric machine and one of the axle shafts which is directly coupled to a differential.

FIG. 3 shows the electric axle 202 with the housing removed to reveal internal componentry. An electric machine 300 (e.g., traction motor) is depicted along with a planetary differential 302. A gear reduction 304 with a gear 306 rotationally coupled to an input shaft 308 and a gear 310 that is fixedly coupled to a ring gear in the planetary differential 302 is further depicted. However, as previously discussed, additional gears, shafts, and/or other mechanical components may be used to attach the electric machine and the differential. However, when one gear reduction is used to attach the electric machine to the differential the space efficiency of the electric axle is increased, and the chance of the axle interfering with surrounding components is decreased. Further, the gear reduction 304 may be positioned in a gear train 305 that may be generally referred to as a transmission.

The wheel end gear reduction 212 with a gear 312 and a gear 314 is again shown along with another wheel end gear reduction 316 that includes a gear 318 and a gear 320. The gear 320 is coupled to an axle shaft 322 and the gear 318 is coupled to a drive wheel shaft 324. Likewise, the gear 314 is coupled to an axle shaft 325 and the gear 312 is coupled to a drive wheel shaft 326. Using the wheel end gear reductions in the electric axle allows the drive wheels to be positioned in a desired location while enabling the axle shaft 322 to pass along a longitudinal side 328 of the electric machine 300.

The gears in the electric axle 202 are depicted as bevel gears. However, other types of gears may be used for at least a portion of the electric axle gears, in other embodiments. It will be understood that the drive wheel shafts are designed to couple (e.g., directly couple) drive wheels such that torque is transferred therebetween.

The axle shaft 322 is longer than the axle shaft 325 which allows the axle shaft 322 to extend down the longitudinal side 328 of the electric machine 300. Arranging the axle shaft in this manner allows the compactness of the electric axle to be increased. Further, the axle shaft 322 may be a jumper shaft, as previously indicated.

Bearings 330 are shown coupled to the input shaft 308. A bearing 332 is coupled to the axle shaft 322 adjacent to an inner axial side of planetary differential 302. Further, bearings 334 are coupled to opposing sides of the gear 314 and the gear 320 in the wheel end gear reductions. Still further, bearings 336 are coupled to opposing sides of the gear 312 and the gear 318 in the wheel end gear reduction.

Rotational axes 340, 342 of the axle shafts 322, 325 are coaxially arranged. Rotational axes 344, 346 of the drive wheel shafts 324, 326 are coaxially arranged. Further, the rotational axes 340, 342 of the axle shafts 322, 325 are parallel to but offset from the rotational axes 344, 346 of the drive wheel shafts 324, 326 in the illustrated example. Further, a rotational axis 347 of the electric machine 300 is offset but parallel to the rotational axes 344, 346. As such, the rotational axis 347 of the electric machine 300 is not coaxial to the drive wheel shafts 324, 326. In this way, the electric axle is able to achieve a desired profile which is less likely to interfere with surrounding vehicle components. To elaborate, the axle is able to achieve a desired wheel centerline that may be constrained by vehicle parameters such as vehicle dynamics (e.g., suspension dynamics), suspension layout, frame layout, and the like.

FIG. 3 further shows the electric machine 300 with a housing 348 (e.g., cylindrical housing). The electric machine 300 is positioned laterally between the first drive wheel shaft 324 and the second drive wheel shaft 326.

Figures 4, 5:
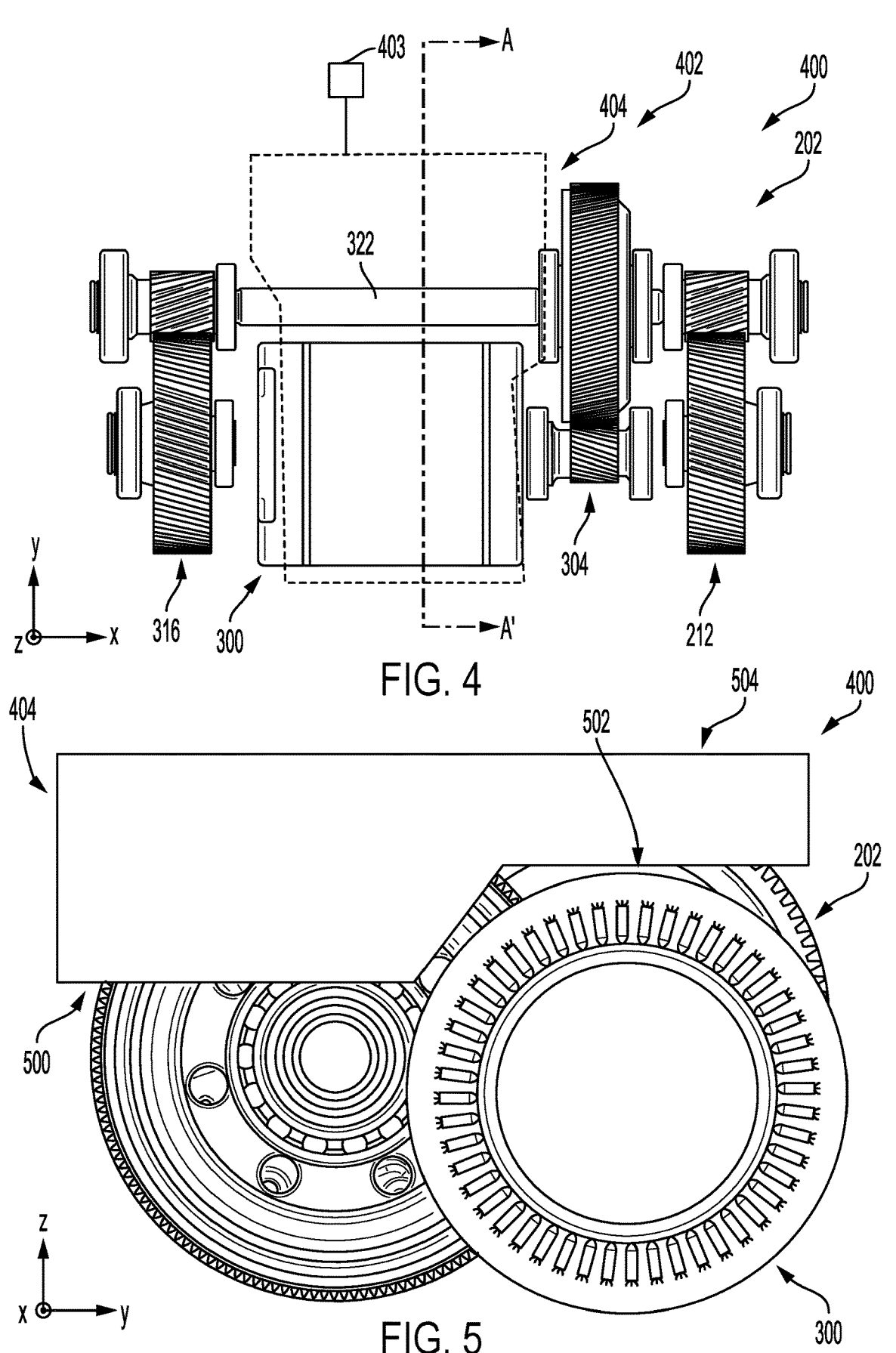

FIG. 4 shows a top view of the electric axle 202 which is incorporated into a hybrid powertrain 400 that includes a lubrication system 402 with a lubricant reservoir 404 (e.g., oil pan). The lubrication system 402 may be used to supply oil or other suitable lubricant to an internal combustion engine 403. The lubrication system 402 may include components such as one or more pumps (e.g., a lift pump, a higher pressure pump, and the like), filter(s), lubricant lines, valves, and the like for delivering lubricant to cylinders and/or other components with lubricant demands in the internal combustion engine.

The lubricant reservoir 404 is positioned above the axle shaft 322 and the electric machine 300. In this way, the reservoir 404 is space efficiently incorporated into the electric axle 202. Further, positioning the lubricant reservoir above the axle shaft 322 and the electric machine 300 allows the reservoir to achieve a desired size. Still further, the lubricant reservoir 404 is positioned laterally between the wheel end gear reductions 212, 316 in the illustrated example, to further increase the axle's space efficiency. To elaborate, the lubricant reservoir 404 is specifically positioned between the gear reduction 316 and the wheel end gear reduction 304, in the illustrated example. However, the lubricant reservoir may be positioned in another suitable position, in other examples. Cutting plane A-A' indicates the cross-sectional view depicted in FIG. 5.

FIG. 5 again shows the hybrid powertrain 400 with the lubricant reservoir 404 and the electric axle 202. A section 500 of the lubricant reservoir 404 may be positioned below the top 502 of the electric machine 300. The lubricant reservoir section 500 may have a greater height than a section 504.

Figures 6, 7:
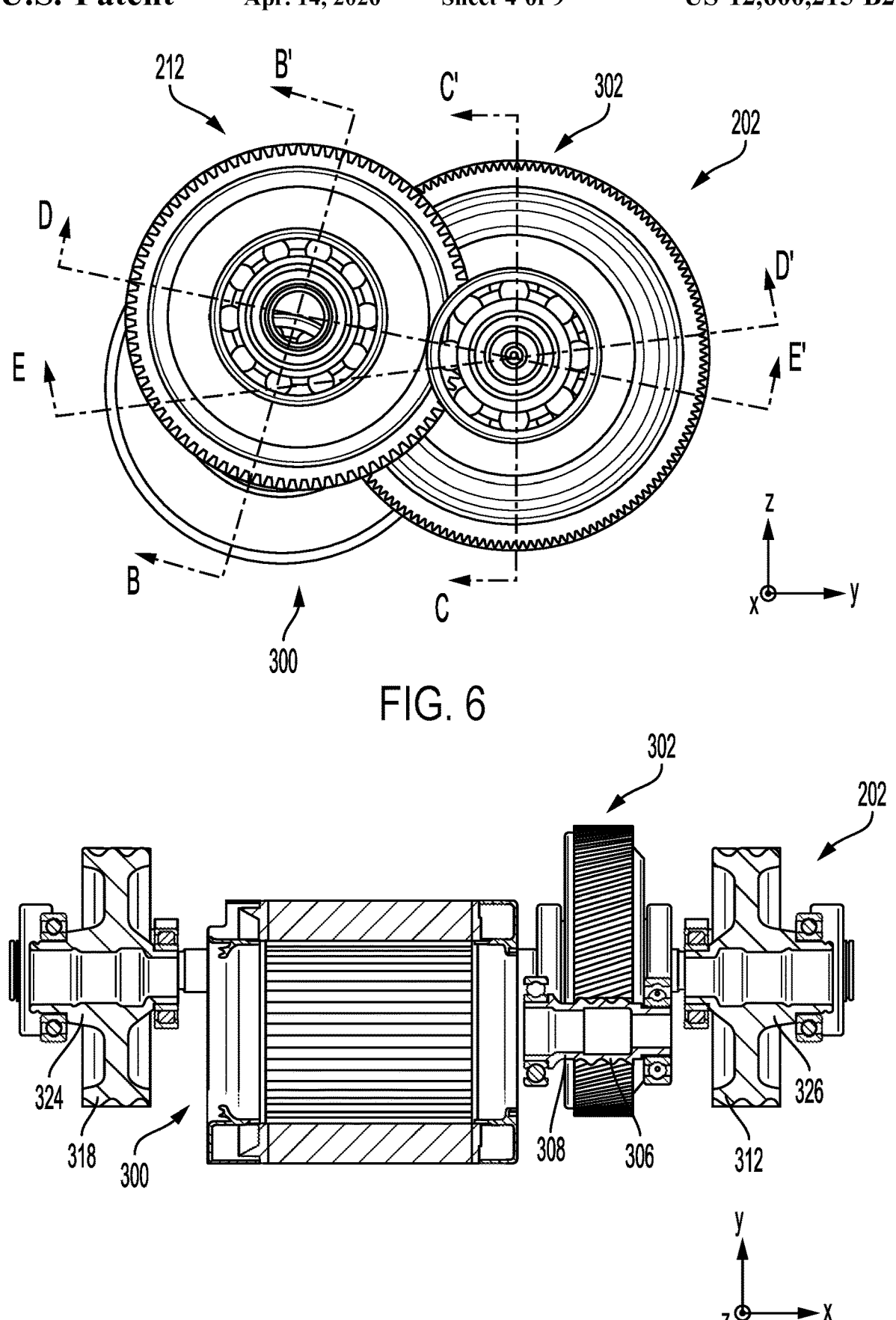

FIG. 6 shows a side view of the electric axle 202. The wheel end gear reduction 212, the electric machine 300, and the planetary differential 302 are again depicted. Cutting plane B-B' denotes the cross-sectional view shown in FIG. 7, cutting plane C-C' denotes the cross-sectional view shown in FIG. 8, cutting lane D-D' denotes the cross-sectional view shown in FIG. 9, and cutting plane E-E' denotes the cross-sectional view shown in FIG. 10.

FIG. 7 shows the electric axle 202 with the electric machine 300, the planetary differential 302, and the drive wheel shafts 324, 326 and the gears 318, 312 coupled thereto, respectively. The input shaft 308 with the gear 306 is further shown in FIG. 7.

Figure 8:
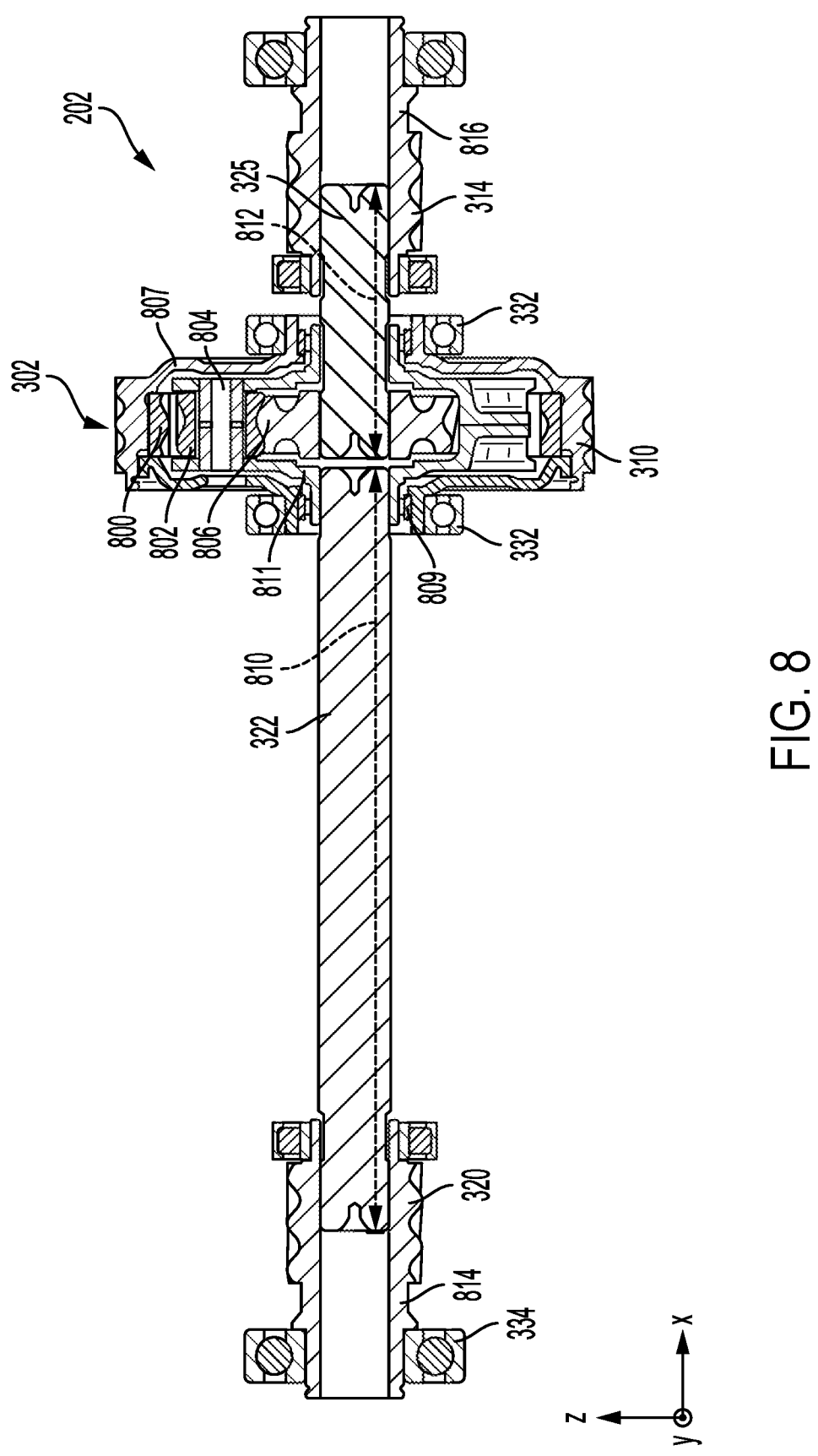

FIG. 8 shows a cross-sectional view of the planetary differential 302 in the electric axle 202. The differential includes the gear 310 (which functions as an input gear). The gear 310 is fixedly coupled to a ring gear 800. In this way, the space efficiency of the differential is increased. The ring gear 800 meshes with planet gears 802 that rotate on a carrier 804. The planet gears 802 mesh with a sun gear 806. The carrier 804 is rotationally coupled to the axle shaft 322 and the sun gear 806 is rotationally coupled to the axle shaft 325.

Bearings 332 are shown coupled to opposing sides of the differential 302. To elaborate, the bearings 332 may be coupled to a case 807 of the differential to permit rotation of the ring gear 800 and the input gear 310. Further, bearings 809 (e.g., needle roller bearings) may be coupled to the case 807 and the carrier sections 811. In this way, the case and the carrier are allowed to independently rotate.

An axial length 810 of the axle shaft 322 is greater than an axial length 812 of the axle shaft 325, in the illustrated example. When the axle shaft 322 is longer than the axle shaft 325, the axle shaft 322 is able to pass along the longitudinal side of the electric machine and provide a space efficient axle package with wheel end gear reductions that enable the axle to achieve a desired wheel center location.

Further, in the illustrated example, the axle shaft 322 is rotationally coupled to a shaft 814 which includes the gear 320 formed thereon and the axle shaft 325 is likewise rotationally coupled to a shaft 816 which includes the gear 314 formed thereon. Designing the axle shafts in this manner allows the wheel end gear reductions to be quickly installed in the axle shafts. However, in other examples, the gears 320, 314 may be directly formed on or coupled to the axle shafts 322, 325. Bearings 334 are shown coupled to opposing sides of the shafts 814, 816.

Figures 9, 10:
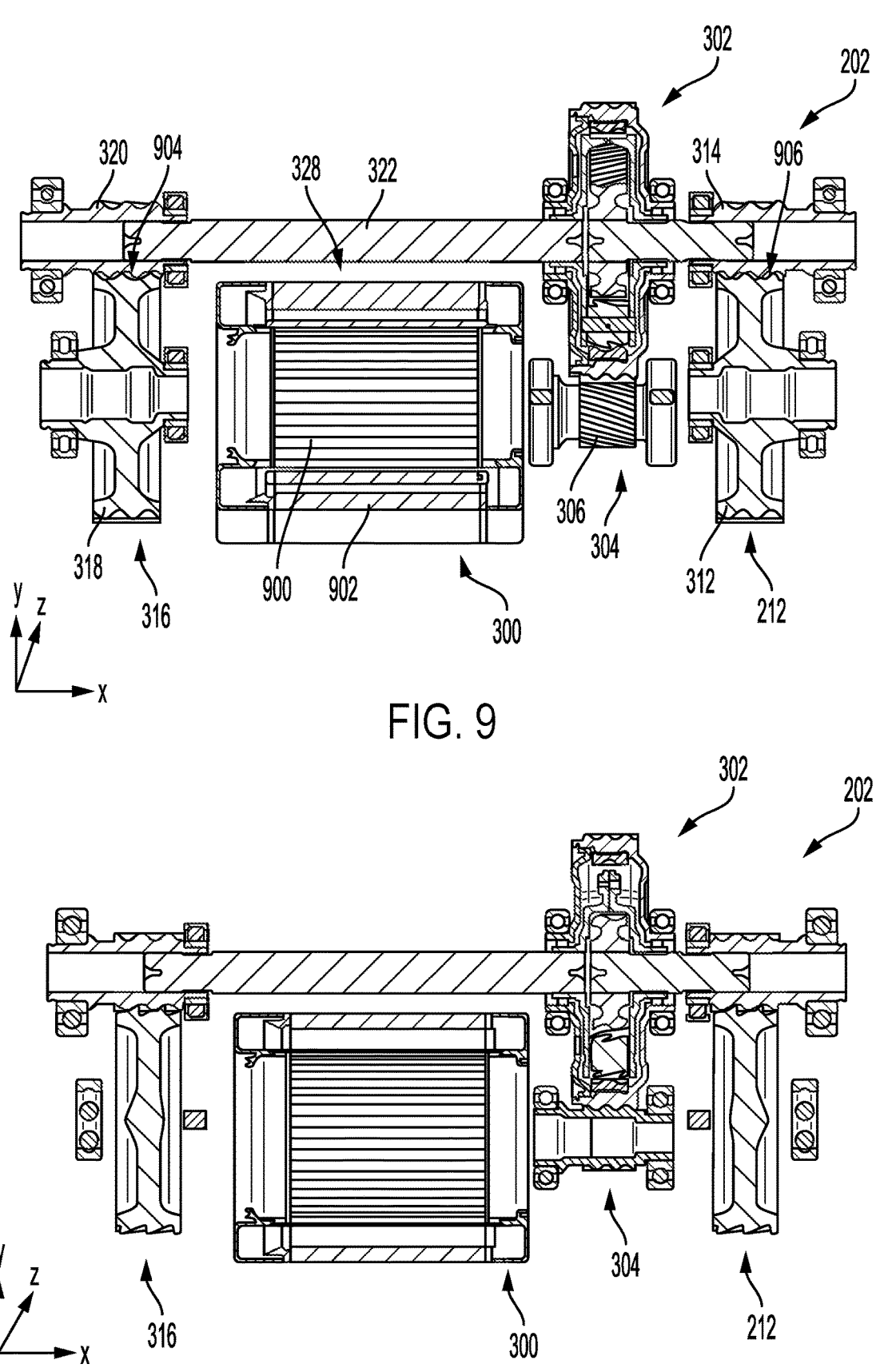

FIG. 9 shows the electric axle 202 with the electric machine 300, the planetary differential 302, the wheel end gear reductions 212, 316, and the gear reduction 304. The electric machine 300 is again shown laterally positioned between the gears 318 and 306. Further, the axle shaft 322 is shown passing along the longitudinal side 328 of the electric machine 300. Additionally, a rotor 900 and a stator 902 of the electric machine 300 are further illustrated in FIG. 9. Further, the mesh 904 between the gear 318 and 320 is shown and the mesh 906 between the gear 312 and the gear 314 is additionally depicted in FIG. 9.

FIG. 10 shows the electric axle 202 with the electric machine 300, the planetary differential 302, the wheel end gear reductions 212, 316, and the gear reduction 304.

Figure 11:
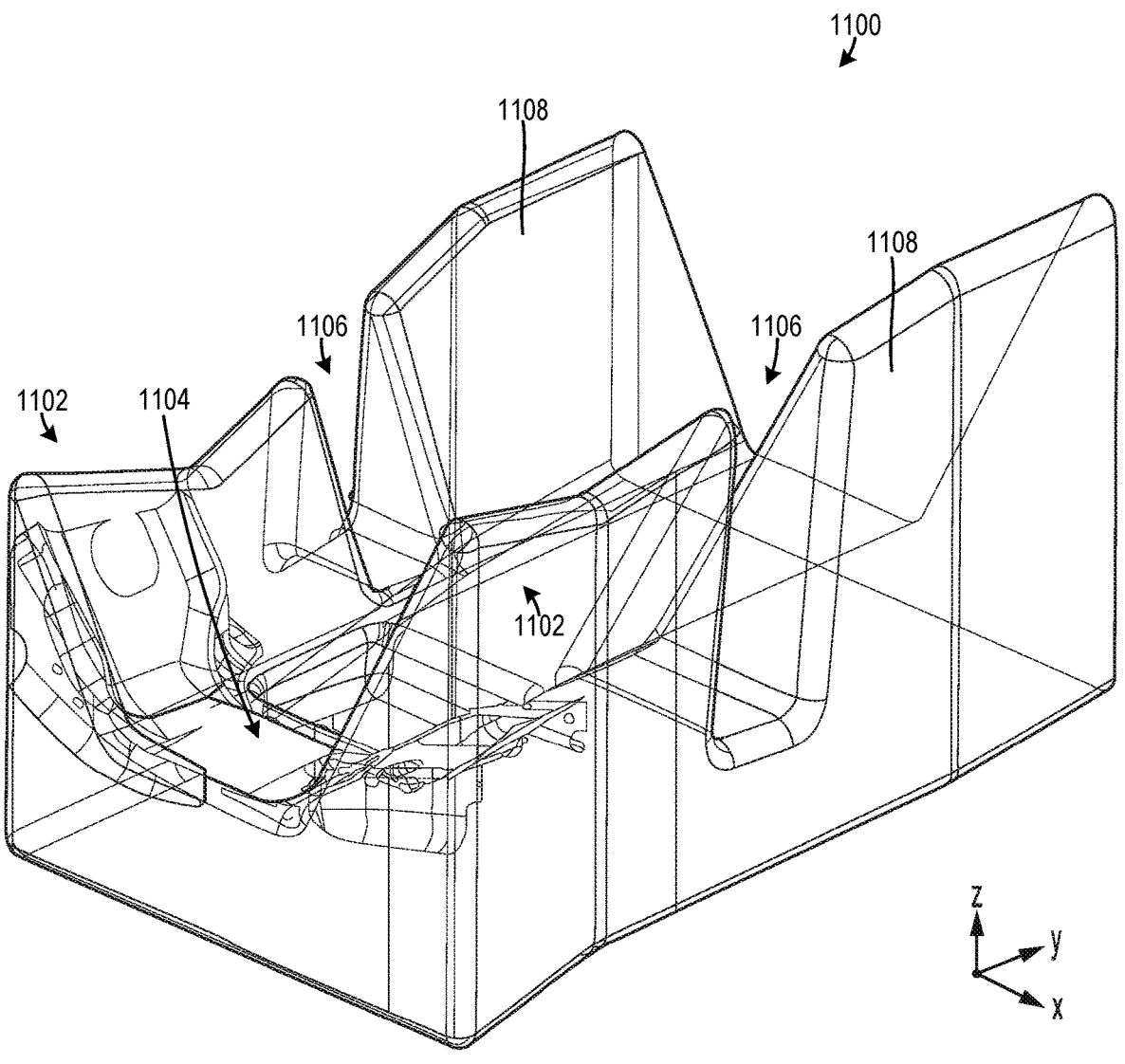
FIG. 11 shows an example of a support structure in which the electric axle may be packaged.

FIG. 11 shows a support structure 1100 with vertically extending protrusions 1102 and a recess 1104 formed therebetween. It will be appreciated that any of the electric axles described herein may be incorporated into the support structure 1100. To elaborate, the wheel end gear reductions may be at least partially positioned in the vertically extending protrusions 1102 and the longer axle shaft and the electric machine may be at least partially positioned in the region below the recess 1104.

Slots 1106 may extend vertically down the lateral sides 1108 of the support structure 1100. When the electric axle is incorporated into the support structure 1100, the wheel end gear reductions, the electric machine, and the differential in the electric axle may be positioned in front of the slots. The slots may enable one or more shafts rotationally coupled to an internal combustion to extend therethrough when the support structure is used to cradle an engine. However, the support structure may not include the slots, in alternate examples. Further, it will be understood that the support structure 1100 be an unsprung mass with regard to the suspension system.

Figure 12:
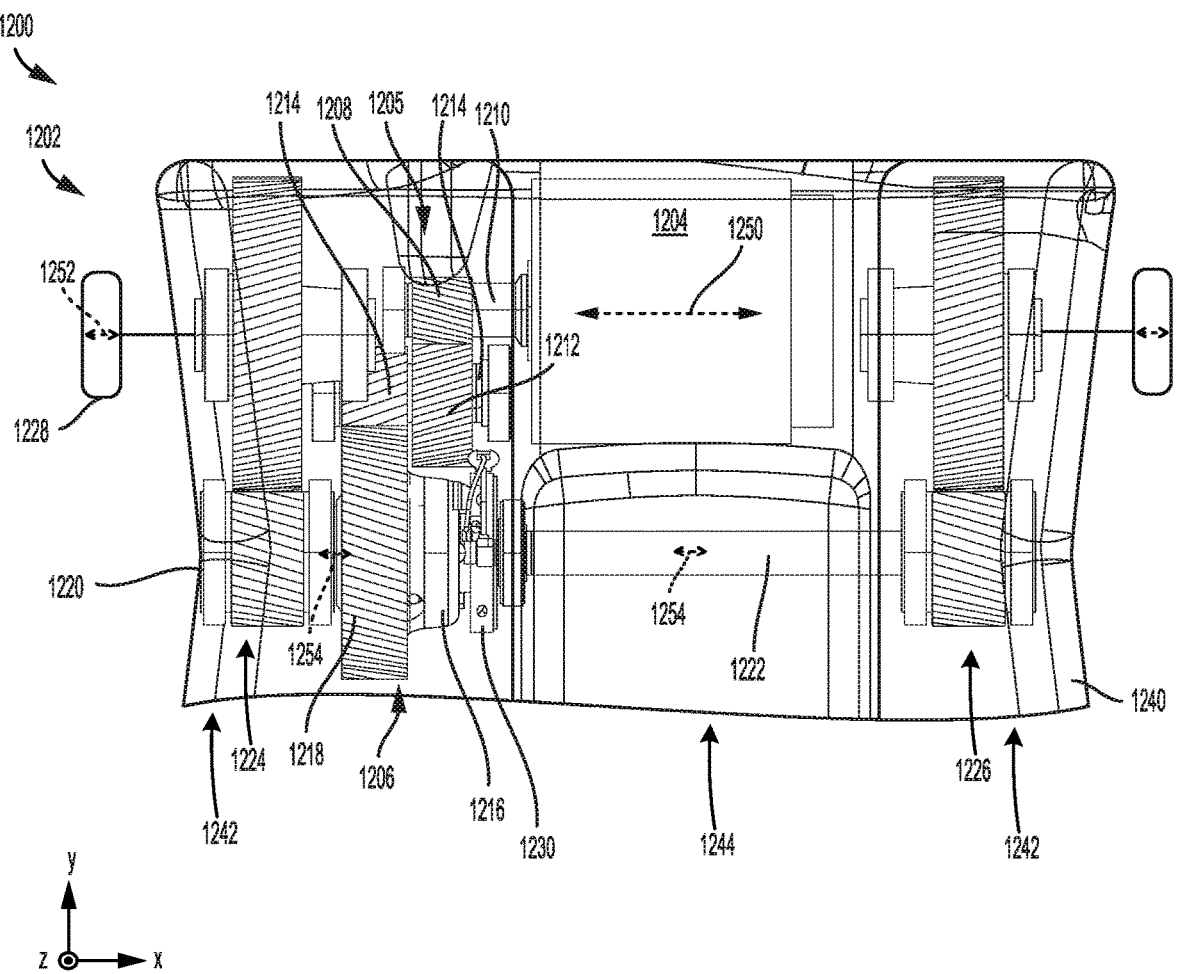
FIGS. 12-13 show different views of a third example of an electric axle.

FIG. 12 shows another example of an electric axle assembly 1200 that includes an electric axle 1202. The electric axle 1202 includes an electric machine 1204 (e.g., traction motor) and other components that are similar to the components in the electric axle 202 depicted in FIGS. 2-10. Redundant descriptions of the overlapping components are omitted for brevity.

The electric axle 1202 includes multi-stage gear reduction 1205 that rotationally couples the electric machine 1204 to a differential 1206. The multi-stage gear reduction 1205 includes a gear 1208 mounted on an input shaft 1210 and gears 1212 mounted on an idler shaft 1214.

The electric axle 1202 further includes the differential 1206. The differential 1206 includes a case 1216, an input gear 1218 as well as pinion gears 1300, a pinion shaft 1301, and side gears 1302, shown in FIG. 13, that allow for speed differentiation between a first axle shaft 1220 and a second axle shaft 1222. However, in other examples the differential may be a planetary differential. Wheel end gear reductions 1224, 1226 are coupled to the first axle shaft 1220 and the second axle shaft 1222, respectively. The wheel end gear reductions 1224, 1226 are specifically illustrated as final drive gear reductions. However, in alternate examples, the electric axle may include additional gear reductions between the axle shafts and drive wheels 1228. A wheel end gear reduction refers to a gear reduction downstream of the interface between the differential and the axle shafts.

In the illustrated example, the differential 1206 includes a locking device 1230. However, in other examples, the locking device may be omitted and the differential may be an open differential. The locking device 1230 locks and unlocks the differential. When locked (e.g., engaged), a speed variance between the axle shafts 1220, 1222 is inhibited by the differential. Conversely, when the locking device is unlocked (e.g., disengaged) a speed variance between the axle shafts is permitted. The locking device 1230 may be electromagnetically actuated via an electro-magnetic actuator (e.g., a solenoid), in one example. To elaborate, the electro-magnetic actuator may induce movement of a piston to lock a gear in the differential. However, in other examples, the locking device may be hydraulically or pneumatically actuated. The use of a locker in the differential 1206 enables the drive axle's tractive performance to be enhanced during selected operating conditions.

The wheel end gear reductions 1224, 1226 (e.g., the final gear reductions), shown in FIG. 12 are used in the electric axle 1202 to allow the locking device 1230 to use less energy for actuation due to the differential seeing less torque than axles without the wheel end gear reductions near the wheels.

A rotational axis 1250 of the electric machine 1204 is axially offset from rotational axes 1252 of the drive wheels 1228. It will be appreciated that the rotational axes 1252 of the drive wheels are coaxial to the rotational axes of the drive wheel shafts. Thus, the electric machine 1204 is off wheel center. In this way, the electric axle 1202 achieves desired packaging goals that reduces the chance (e.g., avoids) of the axle interfering with surrounding components such as a frame, particularly during suspension system movement (e.g., jounce and rebound). Further, the rotational axes 1252 of the drive wheels 1228 are axially offset from the rotational axes 1254 of the axle shafts 1220, 1222. In this way, the electric axle achieves greater compactness and a profile that further reduces the chance of the axle interfering with surrounding vehicle systems.

The electric axle 1202 is packaged in a support structure 1240, which may have a similar profile to the support structure 1100, shown in FIG. 11. To elaborate, the wheel end gear reductions 1224, 1226, shown in FIG. 12, may be positioned in lateral sections 1242 of the support structure 1240 and the electric machine 1204 and the axle shaft 1222 may be positioned in a section 1244 (e.g., central section) of the support structure which is arranged laterally between the lateral sections. In this way, the electric axle 1202 may be effectively incorporated into the support structure.

Figure 13:
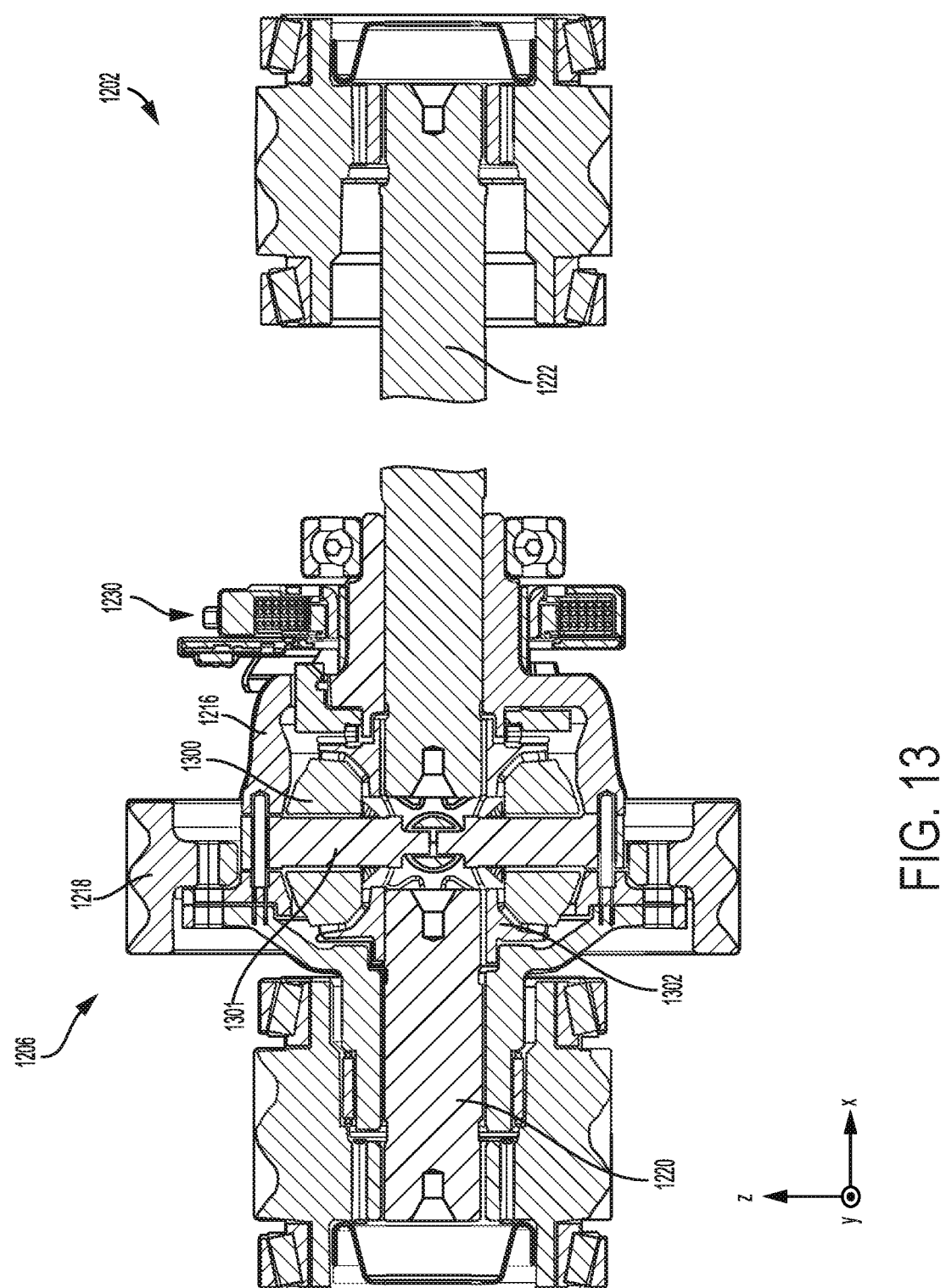

FIG. 13 shows a cross-sectional view of the electric axle 1202. The electric machine 1204 and differential 1206 are again illustrated. As previously indicated the differential 1206 includes the pinion gears 1300, the pinion shaft 1301, and the side gears 1302. However, differentials with alternate designs have been contemplated, such as a planetary differential. The use of a planetary differential allows the axle to achieve greater compactness and pose less space constraints on surrounding vehicle components such as components in the vehicle's suspension system. The locking device 1230 is further depicted in FIG. 13.

The electric axles and associated vehicle components, and more specifically powertrain systems, components, and the like described herein may provide for an operating method of an electric axle, such as any of the previously described electric axles. The electric axle operating method includes adjusting an electric motor based on an acceleration request.

The technical effect of the electric drive axle and operating method described herein is to achieve a space efficient axle package with desired performance characteristics which can be incorporated into a support structure and avoid interference with a vehicle frame.

FIGS. 1-13 show example configurations with relative positioning of the various components. The non-schematically depicted components in FIGS. 2-13 are drawn approximately to scale. However, it will be appreciated that if elements are shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention will be further described in the following paragraphs. In one aspect, an electric axle assembly is provided that comprises an electric machine rotationally coupled to a planetary differential; and a first axle shaft and a second axle shaft directly rotationally coupled to the planetary differential; wherein the second axle shaft is longer than the first axle shaft; wherein the electric machine is positioned laterally between a first drive wheel shaft and a second drive wheel shaft that are rotationally coupled to the first axle shaft and the second axle shaft; and wherein rotational axes of the first and second drive wheel shafts are offset from rotational axes of the first and second axle shafts.

In another aspect, an electric drive assembly is provided that comprises an electric axle comprising: an electric machine rotationally coupled to a planetary differential via a gear reduction; wherein the differential is directly rotationally coupled to a first axle shaft and a second axle shaft that have unequal lengths; and a first wheel end gear reduction rotationally coupling the first axle shaft with a first drive wheel shaft; and a second wheel end gear reduction rotationally coupling the second axle shaft with a second drive wheel shaft.

In yet another aspect, a single speed electric beam axle is provided that comprises a traction motor rotationally coupled to a planetary differential via a gear reduction; wherein the planetary differential is directly rotationally coupled to a first axle shaft and a second axle shaft which have unequal lengths; a first wheel end gear reduction directly rotationally coupled to the first axle shaft; and a second wheel end gear reduction directly rotationally coupled to the second axle shaft; wherein the traction motor is positioned laterally between a first drive wheel shaft and a second drive wheel shaft that are each rotationally coupled to one of the first and second wheel end gear reductions; wherein rotational axes of the first and second drive wheel shafts are offset from and parallel to a rotational axis of the traction motor.

In any of the aspects or combinations of the aspects, the electric axle assembly may further comprise a first wheel end gear reduction directly coupled to the first axle shaft and the first drive wheel shaft; and a second wheel end gear reduction directly coupled to the second axle shaft and the second drive wheel shaft.

In any of the aspects or combinations of the aspects, the first and second wheel end gear reductions may be final drive gear reductions.

In any of the aspects or combinations of the aspects, the electric axle assembly may further comprise a housing that at least partially encloses the electric machine, the differential, and the first and second wheel end gear reductions, wherein the housing includes multiple access panels that provide access to the first and second wheel end gear reductions.

In any of the aspects or combinations of the aspects, a rotational axis of the electric machine may be axially offset from rotational axes of the first and second drive wheel shafts.

In any of the aspects or combinations of the aspects, the electric axle assembly may further comprise a support structure at least partially enclosing the electric machine and the planetary differential, wherein the support structure includes vertically extending protrusions that are profiled to mate with an engine cradle.

In any of the aspects or combinations of the aspects, the electric axle assembly may be a front axle assembly.

In any of the aspects or combinations of the aspects, the electric axle may be a single speed electric axle.

In any of the aspects or combinations of the aspects, the electric axle assembly may be included in a hybrid powertrain.

In any of the aspects or combinations of the aspects, a lubricant reservoir of an internal combustion lubrication system may be positioned below the electric machine and the second axle shaft.

In any of the aspects or combinations of the aspects, a gear in the gear reduction may be an input gear for the planetary differential and the gear may be fixedly coupled to a ring gear in the differential.

In any of the aspects or combinations of the aspects, rotational axes of the first and second wheel shafts may be offset from and parallel to a rotational axis of the electric machine.

In any of the aspects or combinations of the aspects, the electric axle may be a front axle and wherein the second axle shaft may be positioned behind the electric machine.

In any of the aspects or combinations of the aspects, the electric drive assembly may be included in a hybrid powertrain that includes an internal combustion engine and a lubricant reservoir that is positioned above one of the first and second axle shafts and the electric machine.

In any of the aspects or combinations of the aspects, the electric axle may further comprise a support structure at least partially enclosing the traction motor and the planetary differential and a lubricant reservoir coupled to the support structure and positioned below the second axle shaft and the traction motor.

In any of the aspects or combinations of the aspects, the single speed electric beam axle may be a front axle that is included in a hybrid powertrain.

In any of the aspects or combinations of the aspects, a lubricant reservoir of the hybrid powertrain may be positioned below the electric machine and the second axle shaft.

In another representation, a hybrid vehicle system is provided that comprises an electric drive with a traction motor whose central axis is axially offset from drive wheels but positioned parallel thereto and a support structure which at least partially houses the electric axle, wherein the electric axle includes a planetary differential and a first axle shaft that is longer than a second axle shaft, and wherein the first axle shaft and the electric machine are positioned vertically below an oil pan.

In yet another representation, an electric drive unit is provided for a hybrid powertrain, the electric drive unit includes a traction motor that is coupled to a single speed gear train which includes a gear reduction that rotationally connects the traction motor and a planetary differential and wheel end gear reductions that connect axle shafts with unequal lengths and drive wheels.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle assembly comprising:
an electric machine rotationally coupled to a planetary differential, wherein a first gear and a second gear are positioned at opposite ends of the electric machine, and wherein a length of the electric machine extends between the first gear and the second gear; and
a first axle shaft and a second axle shaft directly rotationally coupled to the planetary differential;
wherein the second axle shaft is longer than the first axle shaft, wherein the second axle shaft passes along a longitudinal side of the electric machine without passing through the electric machine;
wherein the electric machine is positioned laterally between a first drive wheel shaft and a second drive wheel shaft that are rotationally coupled to the first axle shaft and the second axle shaft; and
wherein rotational axes of the first and second drive wheel shafts are offset from rotational axes of the first and second axle shafts.

2. The electric axle assembly of claim 1, further comprising:
a first wheel end gear reduction directly coupled to the first axle shaft and the first drive wheel shaft; and
a second wheel end gear reduction directly coupled to the second axle shaft and the second drive wheel shaft, and wherein the longitudinal side of the electric machine along which the second axle shaft passes is a rearward longitudinal side of the electric machine.

3. The electric axle assembly of claim 2, wherein the first and second wheel end gear reductions are final drive gear reductions.

4. The electric axle assembly of claim 2, further comprising a housing that at least partially encloses the electric machine, the planetary differential, and the first and second wheel end gear reductions, wherein the housing includes multiple access panels that provide access to the first and second wheel end gear reductions, wherein the planetary differential is the only planetary device of the electric axle assembly.

5. The electric axle assembly of claim 1, wherein a rotational axis of the electric machine is axially offset from rotational axes of the first and second drive wheel shafts.

6. The electric axle assembly of claim 1, further comprising a support structure at least partially enclosing the electric machine and the planetary differential, wherein the support structure includes vertically extending protrusions that each include a wheel end gear reduction.

7. The electric axle assembly of claim 1, wherein the electric axle assembly is a front axle assembly.

8. The electric axle assembly of claim 1, wherein the electric axle assembly is a single speed electric axle.

9. The electric axle assembly of claim 1, wherein the electric axle assembly is included in a hybrid powertrain, and wherein the second axle shaft is coupled to the planetary differential.

10. The electric axle assembly of claim 9, wherein a lubricant reservoir of an internal combustion lubrication system is positioned above the electric machine and the second axle shaft.

11. The electric axle assembly of claim 1, wherein a gear reduction rotationally couples the electric machine and the planetary differential and a gear in the gear reduction is an input gear for the planetary differential and the gear is fixedly coupled to a ring gear in the planetary differential.

12. An electric drive assembly, comprising:
an electric axle comprising:
an electric machine rotationally coupled to a planetary differential via a gear reduction;
wherein the planetary differential is directly rotationally coupled to a first axle shaft and a second axle shaft, wherein the second axle shaft is positioned on a rearward longitudinal side of the electric machine without passing through the electric machine and is longer than the first axle shaft, wherein a first end of the second axle shaft is coupled to a first gear, wherein a second end of the second axle shaft is coupled to a second gear, and wherein the first gear and the second gear are positioned at opposite ends of the electric machine; and
a first wheel end gear reduction rotationally coupling the first axle shaft with a first drive wheel shaft; and
a second wheel end gear reduction rotationally coupling the second axle shaft with a second drive wheel shaft.

13. The electric drive assembly of claim 12, wherein rotational axes of the first and second drive wheel shafts are offset from and parallel to a rotational axis of the electric machine, and wherein the second axle shaft passes along the rearward longitudinal side of the electric machine outside of the electric machine.

14. The electric drive assembly of claim 12, wherein the electric axle is a front axle and wherein the second axle shaft is positioned behind the electric machine.

15. The electric drive assembly of claim 14, wherein the electric drive assembly is included in a hybrid powertrain that includes an internal combustion engine and a lubricant reservoir that is positioned above one of the first and second axle shafts and the electric machine.

16. The electric drive assembly of claim 12, wherein a ring gear of the planetary differential is at least partially positioned axially between the electric machine and a gear in the first wheel end gear reduction.

17. A single speed electric beam axle, comprising:
a traction motor rotationally coupled to a planetary differential via a gear reduction wherein a first gear and a second gear are positioned at opposite ends of the traction motor, and wherein a length of the traction motor extends between the first gear and the second gear;
wherein the planetary differential is directly rotationally coupled to a first axle shaft and a second axle shaft, and where the second axle shaft is longer that the first axle shaft and passes along a longitudinal side of the traction motor without passing through the traction motor, and wherein a first end of the second axle shaft is coupled to the first gear, wherein a second end of the second axle shaft is coupled to the second gear;
a first wheel end gear reduction directly rotationally coupled to the first axle shaft; and
a second wheel end gear reduction directly rotationally coupled to the second axle shaft;
wherein the traction motor is positioned laterally between a first drive wheel shaft and a second drive wheel shaft that are each rotationally coupled to one of the first and second wheel end gear reductions; and
wherein rotational axes of the first and second drive wheel shafts are offset from and parallel to a rotational axis of the traction motor.

18. The single speed electric beam axle of claim 17, further comprising a support structure at least partially enclosing the traction motor and the planetary differential and a lubricant reservoir which is coupled to the support structure and positioned above the second axle shaft and the traction motor.

19. The single speed electric beam axle of claim 17, wherein the single speed electric beam axle is a front axle that is included in a hybrid powertrain, and wherein the second axle shaft is adjacent the longitudinal side of the electric machine.

20. The single speed electric beam axle of claim 19, wherein a lubricant reservoir of the hybrid powertrain is positioned below the traction motor and the second axle shaft.

* * * * *